Patented Aug. 8, 1950

2,517,772

UNITED STATES PATENT OFFICE 2,517,772

NEUTRALIZED OXIDIZED CELLULOSE PRODUCTS

Leonard Doub and Walter H. Seegers, Detroit, Mich., assignors to Parke, Davis & Company, Detroit, Mich., a corporation of Michigan No Drawing. Application May 11, 1945, Serial No. 593,332

4 Claims. (Cl. 167—84)

This invention relates to new partially oxidized and neutralized cellulose products and methods of making the same.

The main objects of our invention are to devise a method of preparation of partially oxidized and neutralized celluloses which are stable and possess exceptionally high hemostatic properties and also to prepare surgical dressings therefrom.

We have found that it is possible to produce such dressings by impregnation of an aggregate of independent fibers of an oxidized and neutralized cellulose with purified thrombin. This impregnation may be carried out either by dusting the partially oxidized and neutralized dressing with dry thrombin powder or by immersion of the dressing in an aqueous solution of thrombin. The wet impregnated bandage can be used wet or it can be dried either under reduced pressure at a relatively low temperature or preferably by first freezing the wet impregnated product and then drying it from the frozen state under greatly reduced pressures. In most cases the dry dressings will be preferred.

We prefer to carry out the steps of our invention under aseptic conditions employing only sterile partially oxidized and neutralized celluloses and aseptic solutions of thrombin. When the complete process is carried out in this manner a sterile dressing is obtained which may be packaged under aseptic conditions for future use. It should be understood that while the preferred method of producing these dressings is under aseptic conditions, since an additional final sterilization step is thereby avoided, these same dressings may, however, be obtained by sterilization of the final product produced under conditions which are not aseptic.

In view of the fact that these new cellulose derived products are produced as a result of two chemical changes and one physical change in the original unoxidized cellulose, it is indeed surprising that they are nevertheless sufficiently light in color, flexible, fibrous, non-friable and of relatively high tensile strength to be made into dressings of great practical value.

The partially oxidized celluloses used in the practice of the present invention must be neutralized to such a degree that when placed in an aqueous solution of thrombin there is little loss of thrombin activity. On the other hand, they must not be neutralized to such a degree that they lose their fibrous nature when placed in water because of solution or gelling and disintegration. These upper and lower limits of degree of neutralization can readily be determined for a given partially oxidized cellulose and thrombin combination by tests of the hemostatic properties and the extent of action by water on the fibers. We prefer to use partially oxidized and neutralized celluloses which are neutralized to the extent that when approximately 50 mg. of the material is placed in 5 ml. of water the pH of the resulting aqueous mixture is between 5.5 and 7.5, since substantially no thrombin is destroyed in this pH range.

The advantages of the products of our invention are many and varied as will be seen from the following description. In the development of the present invention we first found that it was not possible to impregnate absorbable surgical dressings, i. e. a dressing containing fibers of partially oxidized but unneutralized celluloses and the like with thrombin, due to the rapid and complete destruction of thrombin activity on contact with these materials. We then found, however, in accordance with this invention, that powdered thrombin and aqueous solutions of thrombin upon contact with partially oxidized celluloses which are at least partially neutralized to the degree mentioned above but which are not completely neutralized are stable and that thrombin activity is not impaired. Moreover, we also discovered that impregnation of these latter materials with thrombin does not destroy their fibrous nature and that they are still suitable for use in dressings.

The following specific examples are given for the sole purpose of illustrating our invention without limiting it in any way to the specific conditions, concentrations, etc. described therein.

Example 1

10 g. (3.5 square feet) of sterile oxidized cellulose gauze [16% carboxyl groups, prepared by the methods of Kenyon et al., J. Am. Chem. Soc. 64, 121 and 127 (1942)] is neutralized by immersion in 500 ml. of a sterile, aqueous 0.5 M calcium acetate solution for thirty minutes. At the end of this time the solution is decanted and replaced with a fresh 500 ml. portion of the calcium acetate solution and the bandage allowed to remain in contact with the solution for two hours. The gauze is removed, pressed as dry as possible and then washed first with alcohol and then with ether. After evaporation of the ether a 50 mg. sample when placed in 5 ml. of water gives a mixture of pH 6.0.

Three grams of the resulting neutralized partially oxidized cellulose is impregnated by immersion for one minute in 100 ml. of an aqueous solution of thrombin (1360 units per ml.). The bandage is removed, frozen and dried from the frozen state. All the above operations are carried out under aseptic conditions and as a result a sterile, stable and highly hemostatic surgical dressing is obtained. The dry dressing still retains its tensile strength and fibrous nature and readily absorbs liquids.

A sample of the product is assayed for thrombin by immersing one square inch of the gauze in 5 cc. of an isotonic saline solution and measuring the thrombin content of the solution quantitatively by known methods. In the case of the above dressing the thrombin content is 125 units per square inch of gauze.

This particular surgical dressing also possesses the added advantage that it contains calcium ions which ion is known to be necessary for the conversion of prothrombin to thrombin.

Example 2

Three grams (1 square foot) of sterile oxidized cellulose gauze (14% carboxyl groups and prepared by the method referred to in Example 1) is immersed in 130 ml. of a sterile 0.15 M aqueous solution of sodium bicarbonate. The gauze is manipulated under the surface of the liquid until the evolution of carbon dioxide ceases (four to five minutes). The partially neutralized product is removed, washed with sterile distilled water and dried. Approximately 50 mg. of this gauze when placed in 5 ml. of water gives a mixture of pH 6.2.

The gauze obtained in the above manner is impregnated with thrombin by immersion in 100 ml. of an aqueous solution of thrombin (1350 units per ml.) for three minutes. The bandage is removed, frozen and dried from the frozen state. When the above processes are carried out under aseptic conditions the result is a sterile and highly hemostatic surgical dressing. The dressing prepared in this example contains 50 units of thrombin per square inch when assayed by the method described in Example 1.

Example 3

30 grams (10 square feet) of oxidized cellulose gauze (18% carboxyl groups and prepared by the method referred to in Example 1) is immersed for one hour in 2 l. of 1% alcoholic (95% ethanol) ammonia. The gauze is removed, washed with ether and the ether allowed to evaporate. When approximately 50 mg. of this partially neutralized partially oxidized cellulose is immersed in 5 ml. of water, the pH of the aqueous mixture is 6.7.

The above bandage is impregnated with thrombin by immersion for one minute in 1500 ml. of an aqueous solution of thrombin (1200 units per ml.). The gauze is removed and dried under reduced pressure (1 to 3 mm.) at a temperature below 15° C. We prefer to carry out these processes under aseptic conditions to produce a sterile gauze but this is not necessary if the completed surgical dressing is sterilized after impregnation.

The highly hemostatic and stable surgical dressing prepared as described above contains 75 units of thrombin per square inch when assayed according to the method described in Example 1.

Example 4

15 grams (5 square feet) of oxidized cellulose gauze (15% carboxyl groups and prepared by the method referred to in Example 1) is immersed in 1 l. of a 1% alcoholic (95% ethanol) ethylamine solution for one hour. The gauze is removed, washed with 250 ml. of ethanol by immersion, removed and finally washed with ether. After evaporation of the ether a small sample (50 mg.) when placed in 5 ml. of water gives a mixture with a pH of 5.5.

Five grams of the above product is impregnated with thrombin by immersion in 1 l. of an aqueous thrombin solution (1125 units per ml.) for two minutes. The gauze is removed, frozen and dried from the frozen state.

The surgical dressing which is obtained by the above procedure under aseptic conditions and using sterile reagents and gauze is a sterile, stable and highly hemostatic product. This dressing contains 75 units of thrombin per square inch when assayed according to the method described in Example 1.

Example 5

3 grams (1 square foot) of sterile oxidized cellulose gauze (8% carboxyl groups and prepared by the method referred to in Example 1) is supported in a closed 2 l. vessel over 100 ml. of concentrated aqueous ammonia at 25° C. under aseptic conditions. The neutralization process which is very rapid is complete within a few minutes and the gauze is aseptically removed as soon as it acquires a very light tan color. The removal of ammonia vapors from the gauze is accomplished by subjecting the bandage to reduced pressures or aeration with sterile air. A 50 mg. sample of the partially neutralized gauze prepared in this manner when placed in 5 ml. of water gives a mixture of pH 6.2.

The sterile surgical gauze obtained as above is dusted with solid thrombin (2000 units per mg. dry weight) under aseptic conditions and in such a manner as to produce a sterile, stable and highly hemostatic dressing having 500 units of thrombin per square inch when assayed according to the method described in Example 1.

Example 6

5 grams of sterile oxidized cellulose cotton (12.5–13% carboxyl groups and prepared by the method referred to in Example 1) is immersed in 500 ml. of a sterile, aqueous calcium acetate solution (0.5 M) for two hours. The cotton is removed, washed with 95% ethanol and finally with ether. After evaporation of the ether a 50 mg. sample of the cotton when immersed in 5 ml. of water gives a mixture with a pH of 6.0.

The above sample of sterile, partially neutralized oxidized cotton is impregnated with thrombin by immersion for one minute in 600 ml. of a sterile, aqueous solution of thrombin (1300 units per ml.). The cotton is removed and is ready for immediate use, or it may be frozen and dried from the frozen state. The surgical cotton prepared in this manner under aseptic conditions is stable, sterile and highly hemostatic and is particularly valuable for use in the control of hemorrhages.

It should be understood that other water insoluble partially oxidized and neutralized celluloses such as those described in copending application of Leonard Doub and Herbert Phelps Trix entitled "Cellulosic Products and Methods for Obtaining the Same," Serial No. 593,756, filed May 14, 1945, now abandoned, are also suitable materials for use in the practice of the present invention. Celluloses containing 2 to 23% carboxyl groups are disclosed in said application.

What we claim is:

1. A surgical dressing comprising an aggregate of individual fibers of cellulose impregnated with thrombin, said cellulose being partially oxidized by gaseous $NO_2$ to the extent that it is absorbable in body fluids and being neutralized to the extent that said cellulose placed in about 100 times its weight of water gives an aqueous mixture having a pH between 5.5 and 7.5.

2. A surgical dressing comprising an aggregate of individual fibers of cellulose impregnated with thrombin, said cellulose being partially oxidized by gaseous $NO_2$ to contain from 2 to 23% carboxyl groups and being neutralized to the extent that said cellulose placed in about 100 times its weight of water gives an aqueous mixture having a pH between 5.5 and 7.5.

3. A surgical dressing comprising sterile gauze containing at least 50 units of thrombin per square inch, said gauze being cellulose partially oxidized by gaseous $NO_2$ to contain 2 to 23% carboxyl groups and neutralized to the extent that said cellulose placed in about 100 times its weight of water gives an aqueous mixture having a pH between 5.5 and 7.5.

4. A surgical dressing comprising sterile gauze containing about 125 units of thrombin per square inch and containing also calcium ions, said gauze being cellulose partially oxidized by gaseous $NO_2$ to contain about 16% carboxyl groups and neutralized with calcium acetate to the extent that said cellulose placed in about 100 times its weight of water gives an aqueous mixture having a pH about 6.0.

LEONARD DOUB.
WALTER H. SEEGERS.

REFERENCES CITED

The following references are of record in the file of this patent:

UNITED STATES PATENTS

| Number | Name | Date |
| --- | --- | --- |
| 2,232,990 | Yackel et al. | Feb. 25, 1941 |

OTHER REFERENCES

J. Amer. Chem. Soc., July 1931, pages 2725 and 2726.

Proc. Soc. Exp. Biol. and Med., May 1944, pages 72 and 73.

Amer. J. Medical Sciences, Oct. 1941, pages 592 and 593.

Annals of Surgery, July 1943, pages 127 to 129.

War Medicine, Feb. 1944, pages 80 to 82.

Proc. Staff Meetings Mayo Clinic, Jan. 24, 1945, pages 29 to 32.

Journal of Physiology, vol. 47, (1913–1914), pages 44–45.